United States Patent
Nakahira et al.

(10) Patent No.: US 12,082,120 B2
(45) Date of Patent: Sep. 3, 2024

(54) COMMUNICATION CONTROL METHOD, CONTROL STATION, AND COMMUNICATION CONTROL PROGRAM

(71) Applicant: NIPPON TELEGRAPH AND TELEPHONE CORPORATION, Tokyo (JP)

(72) Inventors: Toshiro Nakahira, Musashino (JP); Hirantha Abeysekera, Musashino (JP); Koichi Ishihara, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 176 days.

(21) Appl. No.: 17/911,570

(22) PCT Filed: Mar. 17, 2020

(86) PCT No.: PCT/JP2020/011783
§ 371 (c)(1),
(2) Date: Sep. 14, 2022

(87) PCT Pub. No.: WO2021/186573
PCT Pub. Date: Sep. 23, 2021

(65) Prior Publication Data
US 2023/0362828 A1    Nov. 9, 2023

(51) Int. Cl.
*H04W 52/24*    (2009.01)
*H04W 88/08*    (2009.01)

(52) U.S. Cl.
CPC ............ *H04W 52/24* (2013.01); *H04W 88/08* (2013.01)

(58) Field of Classification Search
CPC .............................. H04W 52/24; H04W 88/08
See application file for complete search history.

(56) References Cited

U.S. PATENT DOCUMENTS 5,878,328 A * 3/1999 Chawla ................. H04W 24/00
455/67.11
6,496,700 B1 * 12/2002 Chawla ................. H04W 16/18
455/435.2
(Continued)

FOREIGN PATENT DOCUMENTS

EP    2612527 B1 *    9/2016    .......... H04W 52/243

OTHER PUBLICATIONS

LAN/MAN Standards Committee of the IEEE Computer Society, Telecommunications and information exchange between systems Local and metropolitan area networks—Specific requirements Part 11: Wireless LAN Medium Access Control (MAC) and Physical Layer (PHY) Specifications, IEEE Std 802.Nov. 2016, IEEE Standard for Information Technology, Dec. 14, 2016.

*Primary Examiner* — Hai V Nguyen
(74) *Attorney, Agent, or Firm* — Harness, Dickey & Pierce, P.L.C.

(57) ABSTRACT

A communication control method for controlling transmission powers transmitted by a plurality of base stations in a coverage area, the coverage area being covered by the plurality of base stations includes setting a transmission power of each base station to a maximum, calculating, for each base station, a percentage of an individual coverage area with respect to the coverage area when the transmission power of each base station is set to the maximum, the individual coverage area serving as a range in which each base station individually accommodates a terminal station, reducing, when a maximum value of the calculated percentages deviates from an average value by a predetermined value or greater, the transmission power of any of the plurality of base stations with the maximum percentage value, newly calculating, for each base station, a percentage of the individual coverage area with respect to the coverage area, and continuing the control until the maximum value of (Continued)

the calculated percentages deviates from the average value by less than the predetermined value.

5 Claims, 6 Drawing Sheets

(56) References Cited

U.S. PATENT DOCUMENTS

| | | | | |
|---|---|---|---|---|
| 7,031,754 B2* | 4/2006 | Scherzer | ............... | H04W 16/00 |
| | | | | 455/562.1 |
| 7,043,254 B2* | 5/2006 | Chawla | ................ | H04B 17/391 |
| | | | | 455/67.11 |
| 8,942,753 B2* | 1/2015 | Ho | ...................... | H04W 52/343 |
| | | | | 455/522 |
| 9,088,335 B2* | 7/2015 | Jong | .................. | H04B 7/18513 |
| 9,408,095 B2* | 8/2016 | Lightstone | ............ | H04W 72/23 |
| 9,439,061 B2* | 9/2016 | Austin | .................. | H04W 48/18 |
| 9,497,714 B2* | 11/2016 | Nagaraja | ............. | H04W 52/243 |
| 9,967,789 B2* | 5/2018 | Asada | ............... | H04W 36/0094 |
| 10,055,682 B2* | 8/2018 | Mar | ....................... | H04B 7/026 |
| 11,419,064 B2* | 8/2022 | Regunathan | ........ | H04W 52/346 |
| 11,595,915 B2* | 2/2023 | Kosseifi | .............. | H04W 52/281 |
| 2002/0142788 A1* | 10/2002 | Chawla | ................. | H04W 16/18 |
| | | | | 455/67.11 |
| 2002/0193104 A1* | 12/2002 | Scherzer | ............... | H04W 16/00 |
| | | | | 455/423 |
| 2007/0263566 A1* | 11/2007 | McHenry | ............... | H04W 16/14 |
| | | | | 370/329 |
| 2012/0225628 A1* | 9/2012 | Ho | ...................... | H04W 52/343 |
| | | | | 455/115.1 |
| 2012/0252453 A1* | 10/2012 | Nagaraja | ............. | H04W 52/244 |
| | | | | 455/436 |
| 2012/0252521 A1* | 10/2012 | Nagaraja | ............. | H04W 52/243 |
| | | | | 455/522 |
| 2013/0165105 A1* | 6/2013 | Whinnett | ............... | H04W 52/36 |
| | | | | 455/422.1 |
| 2015/0223084 A1* | 8/2015 | Lightstone | ............ | H04L 5/0048 |
| | | | | 370/252 |
| 2016/0262316 A1* | 9/2016 | Woolbright | ............. | A01G 9/025 |
| 2016/0366598 A1* | 12/2016 | Gallagher | ........... | H04W 52/367 |
| 2017/0055130 A1* | 2/2017 | LeBlanc | ................ | G01S 5/0009 |
| 2018/0368036 A1* | 12/2018 | Rune | ............... | H04W 36/00837 |
| 2019/0268950 A1* | 8/2019 | Youtz | .................... | H04W 76/30 |
| 2020/0344702 A1* | 10/2020 | Regunathan | ........ | H04W 52/146 |
| 2022/0103214 A1* | 3/2022 | Gopal | .................... | H04B 7/0623 |
| 2023/0224737 A1* | 7/2023 | Nakahira | .............. | H04W 24/08 |
| | | | | 370/252 |

* cited by examiner

COMMUNICATION CONTROL METHOD, CONTROL STATION, AND COMMUNICATION CONTROL PROGRAM

CROSS-REFERENCE TO RELATED APPLICATIONS

This application is a 371 U.S. National Phase of International Application No. PCT/JP2020/011783, filed on Mar. 17, 2020. The entire disclosure of the above application is incorporated herein by reference.

TECHNICAL FIELD

The present disclosure relates to a communication control method, a control station, and a communication control program.

BACKGROUND ART

Examples of radio communication systems using radio waves in the 2.4 GHz and 5 GHz band include those based on the IEEE 802.11a standard and IEEE 802.11 g standard. Here, characteristics of the communication systems in multipath fading environments can be stabilized by using the modulation scheme of orthogonal frequency division multiplexing (OFDM), and thus a maximum transmission rate of 54 Mbit/s can be achieved.

In addition, in a radio communication system based on the IEEE 802.11n standard, a multiple-input multiple-output (MIMO) scheme in which a plurality of antennas are used to perform space division multiplexing on an identical radio channel and a channel bonding technique in which two 20 MHz frequency channels are simultaneously used as a 40 MHz frequency channel are used in the 2.4 GHz or 5 GHz band, and thus a maximum transmission rate of 600 Mbit/s can be achieved.

Further, in a radio communication system based on the IEEE 802.11ac standard, a channel bonding technique in which eight 20 MHz frequency channels are simultaneously used as a 160 MHz frequency channel at maximum, a multi-user MIMO technique in which different signals are simultaneously transmitted to a plurality of destinations on the same radio channel, and the like are used in the 5 GHz band to achieve faster and more efficient radio communication compared to that based on the IEEE 802.11n standard (e.g., see NPL 1).

In addition, if transmission powers of base stations are low in the radio communication system, radio waves do not fully reach within given areas (coverage areas), and conversely, if transmission powers of base stations are high, radio waves interfere with each other between cells, and thus the transmission powers of base stations may be controlled such that an appropriate coverage areas can be formed.

For example, a transmission power control method for controlling a transmission power of a base station has been conceived in the related art so that a terminal station can gain a given reception power in the entire coverage area formed by a radio communication system.

CITATION LIST

Non Patent Literature

NPL 1: IEEE Standard for Information Technology— Telecommunications and Information Exchange between Systems Local and Metropolitan Area Networks-Specific Requirements, Part 11: Wireless LAN Medium Access Control (MAC) and Physical Layer (PHY) Specifications, IEEE Std 802.11-2016, December 2016.

SUMMARY OF THE INVENTION

Technical Problem

However, although there is no particular problem in the transmission power control method of the related art in a case in which base stations are uniformly disposed in the entire coverage area and have the same shielding, the same radio wave propagation environment, and the like therearound, transmission power control in an actual environment may be insufficient compared with the specifications.

For example, if control is performed such that terminal stations can acquire a given reception power in an entire coverage area in a case in which the base stations are non-uniformly disposed in the entire coverage area or the base stations are in different environments, the sizes of the cells (accommodation ranges or individual coverage areas) of the respective base stations may be different.

In addition, in a case in which a plurality of base stations can be detected by a terminal station, the terminal station generally attempts to connect to the base station with the highest reception power. At this time, connections of terminal stations are concentrated on some base stations, which may cause congestion in the radio communication system.

An object of the present disclosure is to provide a communication control method, a control station, and a communication control program that can prevent connections of terminal stations from concentrating on some base stations in a radio communication system.

Means for Solving the Problem

A communication control method according to an aspect of the present disclosure is a communication control method for controlling transmission powers transmitted by a plurality of base stations in a coverage area, the coverage area being covered by the plurality of base stations, the communication control method including setting a transmission power of each base station to a maximum, calculating, for each base station, a percentage of an individual coverage area with respect to the coverage area when the transmission power of each base station is set to the maximum, the individual coverage area serving as a range in which each base station individually accommodates a terminal station, and performing control such that, when a maximum value of the calculated percentages deviates from an average value by a predetermined value or greater, the transmission power of any of the plurality of base stations with the maximum percentage value is reduced and a percentage of the individual coverage area with respect to the coverage area is newly calculated for each base station, in which, in the performing of the control, the control is continued until the maximum value of the calculated percentages deviates from the average value by less than the predetermined value.

In addition, a control station according to an aspect of the present disclosure is a control station that controls transmission powers transmitted by a plurality of base stations in a coverage area, the coverage area being covered by the plurality of base stations, the control station including a setting unit that sets a transmission power of each base station to a maximum, a percentage calculation unit that calculates, for each base station, a percentage of an individual coverage area with respect to the coverage area when the transmission power of each base station is set to the maximum, the individual coverage area serving as a range in which each base station individually accommodates a terminal station, and a control unit that performs control such that, when a maximum value of the percentages calculated by the percentage calculation unit deviates from an average value by a predetermined value or greater, the transmission power of any of the plurality of base stations with the maximum percentage value is reduced and the percentage calculation unit newly calculates, for each base station, a percentage of the individual coverage area with respect to the coverage area, in which the control unit continues the control until the maximum value of the percentages calculated by the percentage calculation unit deviates from the average value by less than the predetermined value.

Effects of the Invention

According to the present disclosure, it is possible to prevent connections of terminal stations from concentrating on some base stations in a radio communication system.

DESCRIPTION OF EMBODIMENTS

Figure 1:
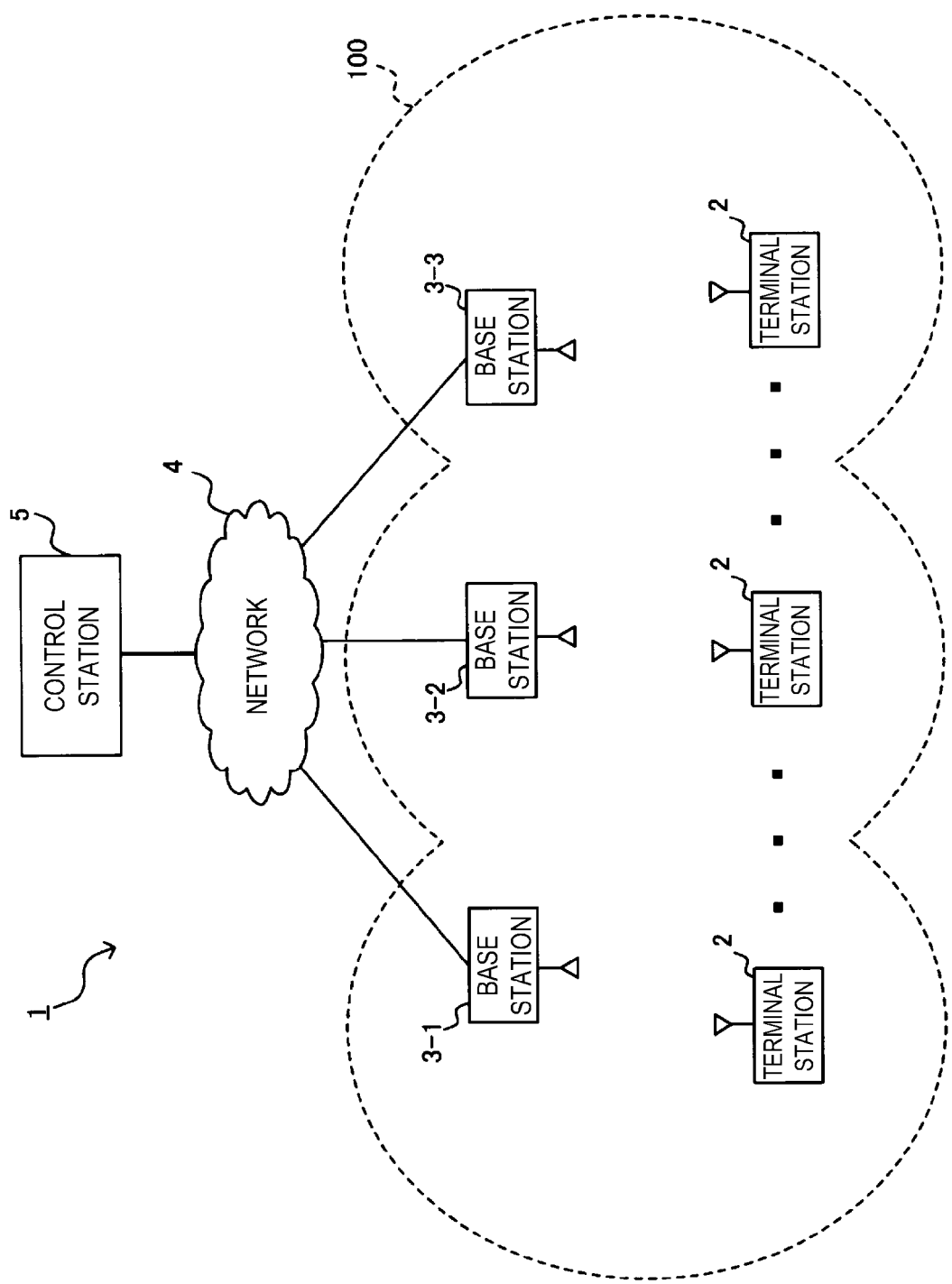
FIG. 1 is a diagram illustrating an exemplary configuration of a radio communication system according to an embodiment.

Hereinafter, an embodiment of a radio communication system will be described with reference to the accompanying drawings. FIG. 1 is a diagram illustrating an exemplary configuration of a radio communication system 1 according to an embodiment. The radio communication system 1 includes, for example, three base stations 3-1 to 3-3 to which a plurality of terminal stations 2 can be connected through radio communication, and a control station 5 connected to a network 4 as illustrated in FIG. 1. Further, unless any of a plurality of constituent components such as the base stations 3-1 to 3-3 is specified, they will be abbreviated simply as, for example, a base station 3, or the like.

Each terminal station 2 receives a signal such as a beacon transmitted by each of the base stations 3, and transmits information such as a signal intensity (reception power) of the received signal, a reception location, an MAC address of the terminal station, and the like, to the base stations 3.

The base stations 3-1 to 3-3 are installed such that the cell (an accommodation range or an individual coverage area) of each base station 3 overlaps the cells of other base stations 3, and the base stations are connected to the network 4.

Here, the individual coverage area is assumed to indicate a range covered individually by each of the base stations 3 based on the definition that any of the base stations 3-1 to 3-3, from which a terminal station 2 at a point (a reception location of the terminal station 2) receives the maximum reception power, accommodates (covers) the terminal station 2 located at that point.

Further, the individual coverage area is not limited to the definition described above, and the individual coverage area may be, for example, an area in which a base station 3 accommodates a terminal station 2, the base station transmitting a signal to be received by the terminal station 2 with a reception power equal to or higher than a predetermined value.

At this time, at least one of the base stations 3-1 to 3-3 is capable of performing radio communication with the terminal stations 2 located in a predetermined area (coverage area) 100. Here, a set of cells of the base stations 3-1 to 3-3, in other words, an area in which the base stations 3-1 to 3-3 are capable of performing radio communication, serves as the coverage area 100.

Further, the coverage area 100 may be set excluding an area in which no terminal stations 2 are present, or may be set by weighting an area in which many terminal stations 2 are present.

Furthermore, the base stations 3-1 to 3-3 are capable of receiving a reception power (signal intensity), an acquired measurement location, and a MAC address transmitted by each of the terminal stations 2.

Figure 2:
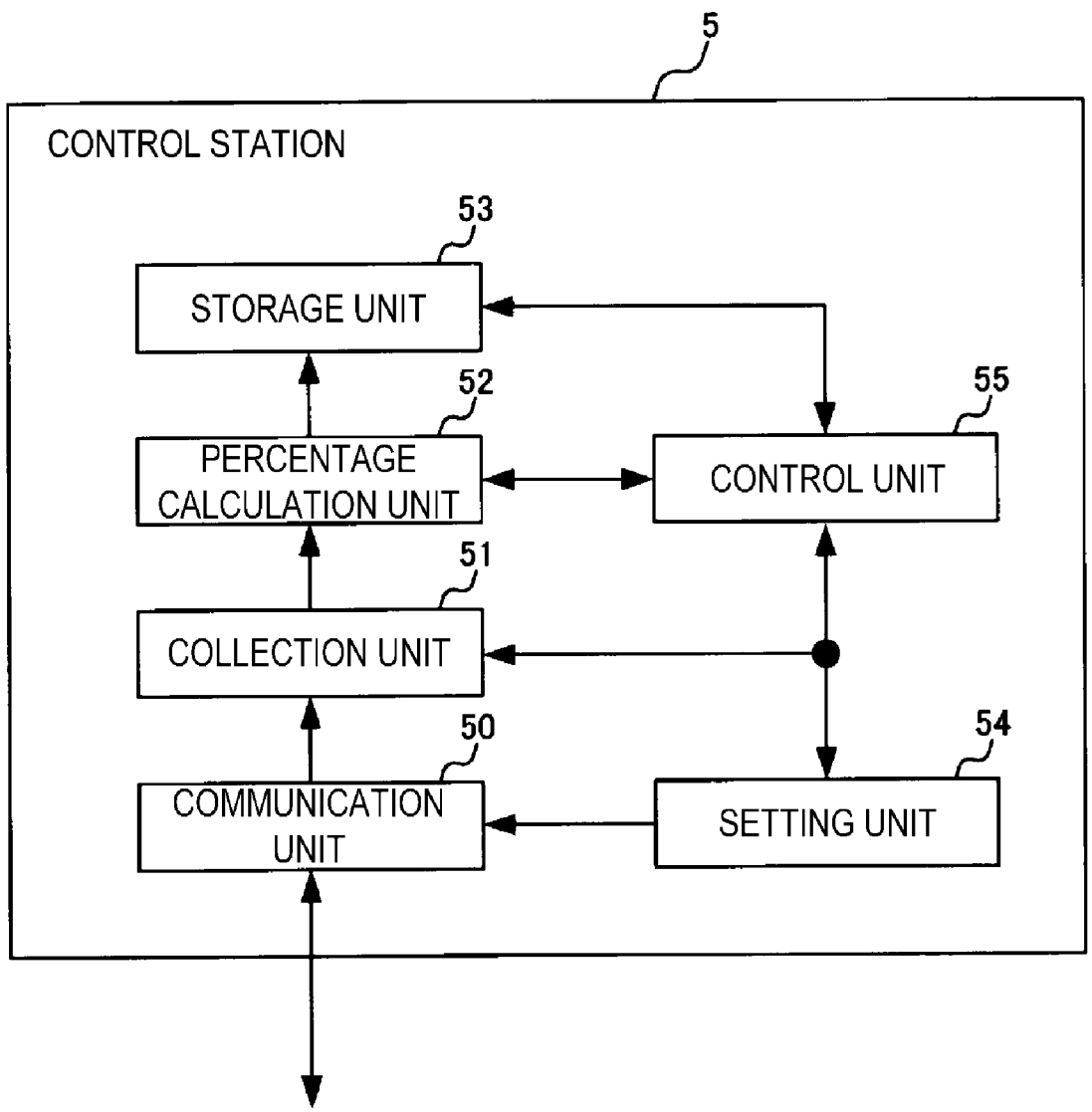
FIG. 2 is a functional block diagram illustrating functions of a control station according to the embodiment.

FIG. 2 is a functional block diagram illustrating functions of the control station 5 according to the embodiment. The control station 5 includes, for example, a communication unit 50, a collection unit 51, a percentage calculation unit 52, a storage unit 53, a setting unit 54, and a control unit 55 as illustrated in FIG. 2. In addition, the control station 5 controls the transmission powers transmitted by the base stations 3 in the one coverage area 100 (see FIG. 1) in which the base stations 3-1 to 3-3 are capable of performing radio communication.

Specifically, the communication unit 50 is a communication interface through which the control station can communicate with each of the base stations 3-1 to 3-3 via the network 4.

The collection unit 51 collects the signal intensities, reception locations, and MAC addresses received by the base stations 3-1 to 3-3 from the terminal stations 2 via the communication unit 50, and outputs the collected information to the percentage calculation unit 52.

The percentage calculation unit 52 calculates, based on the signal intensities, reception locations, MAC addresses, and the like collected by the collection unit 51, the percentages of individual coverage areas 10-1 to 10-3 of the respective base stations 3 with respect to the coverage area 100 (see FIG. 4) (percentages of the individual coverage areas), the individual coverage areas 10-1 to 10-3 being areas in which the base stations 3-1 to 3-3 individually accommodates the terminal stations 2. Then, the percentage calculation unit 52 outputs the calculation results to the storage unit 53 and the control unit 55.

The storage unit 53 stores the results calculated by the percentage calculation unit 52, a communication control program of the control station 5, and the like.

The setting unit 54 sets, for example, a transmission power of each of the base stations 3-1 to 3-3 to be the maximum as an initial value using the communication unit 50. In addition, the setting unit 54 sets a transmission power of each of the base stations 3-1 to 3-3 according to control of the control unit 55.

The control unit 55 controls each of the units constituting the control station 5. For example, in a case in which the maximum value of the percentages calculated by the percentage calculation unit 52 deviates from the average value by a predetermined value or greater, the control unit 55 performs control such that the transmission power of any of the base stations 3-1 to 3-3 with the maximum percentage value is reduced and the percentage calculation unit 52 newly calculates, for each base station 3, the percentage of the individual coverage area with respect to the coverage area.

In addition, the control unit 55 continues to perform control until the maximum value of the percentages calculated by the percentage calculation unit 52 deviates from the average value by less than the predetermined value. In addition, the control unit 55 performs control such that the transmission power of any one of the base stations 3-1 to 3-3 is reduced within a range in which all of the terminal stations 2 located in the coverage area 100 are capable of performing radio communication with at least one of the base stations 3-1 to 3-3. The control unit 55 may perform control such that a transmission power of a predetermined base station 3 is increased.

Figure 3:
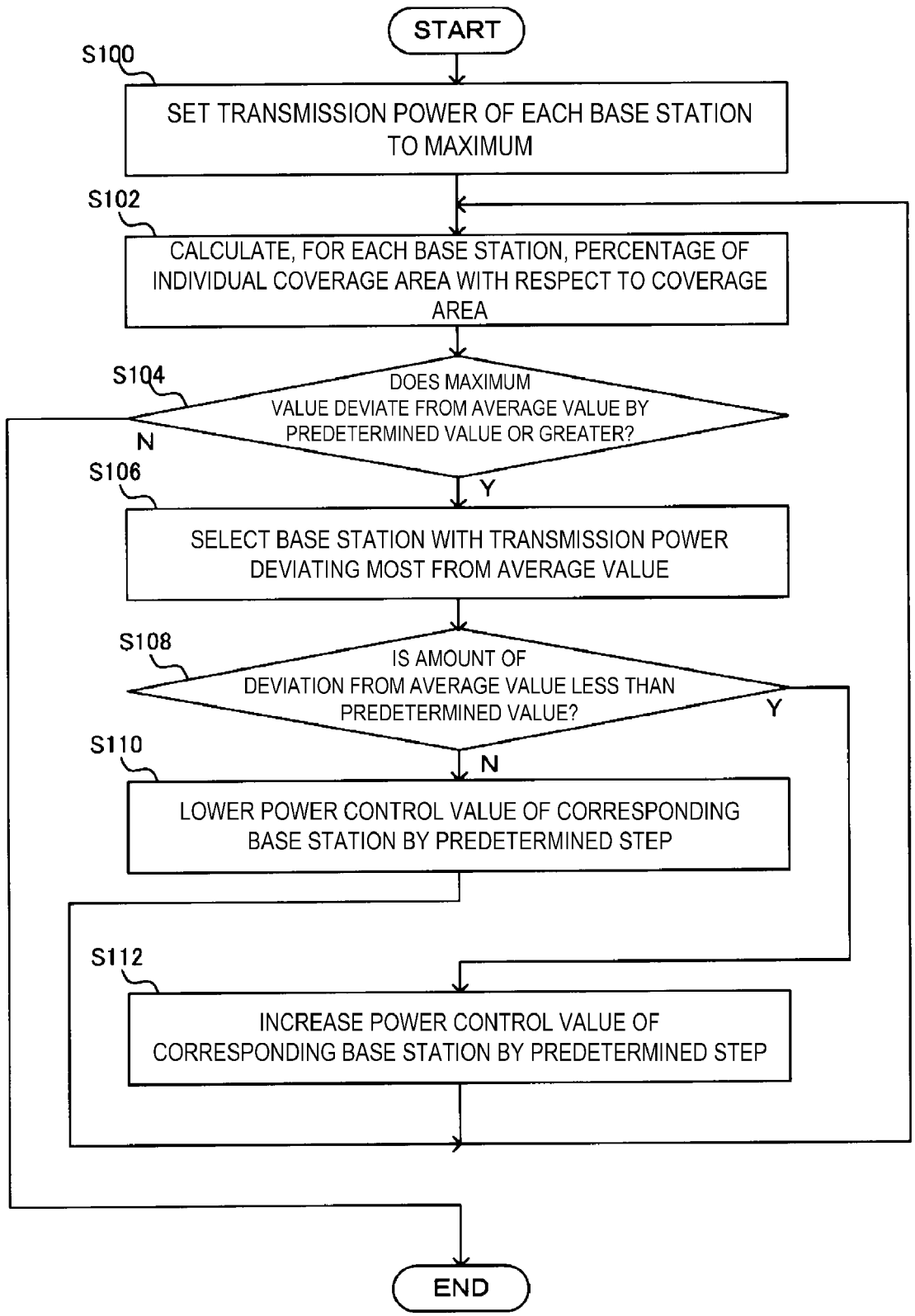
FIG. 3 is a flowchart illustrating specific exemplary communication control performed by the control station according to the embodiment.
Figure 4:
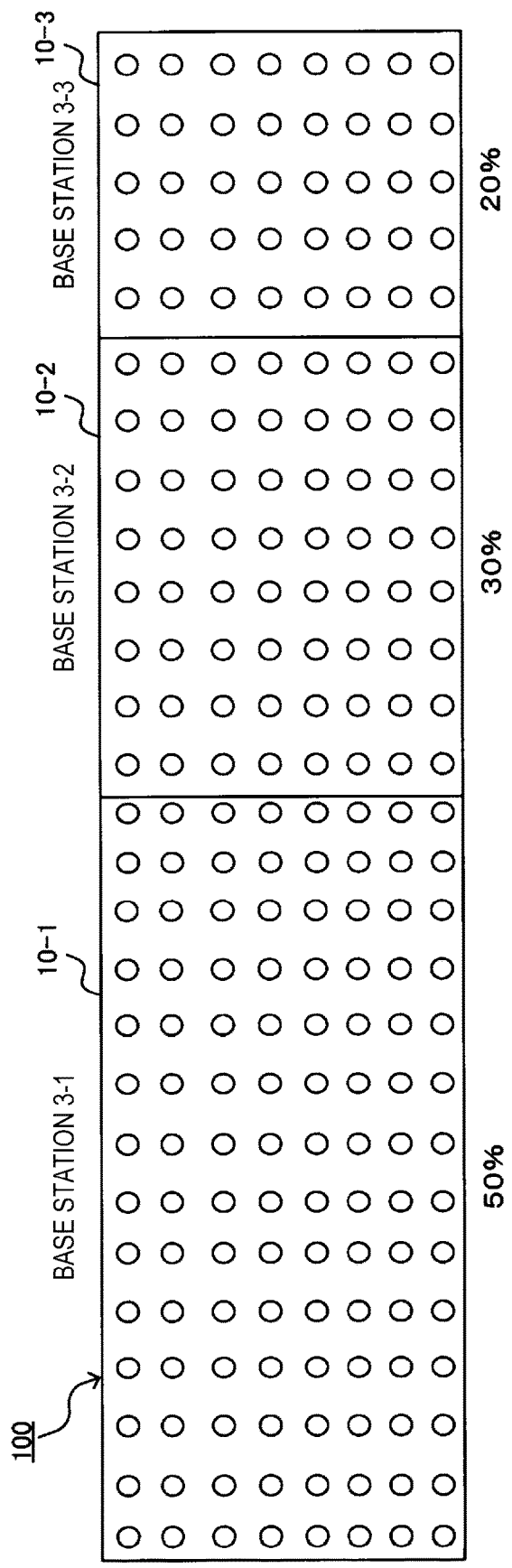
FIG. 4 is a diagram schematically illustrating a relationship between individual coverage areas of base stations and a coverage area of a radio communication system.
Figure 5:
FIG. 5 is a diagram schematically illustrating processes of the communication control performed by the control station according to the embodiment.

Next, specific exemplary communication control performed by the control station 5 will be described with reference to FIGS. 3 to 5. FIG. 3 is a flowchart illustrating specific exemplary communication control performed by the control station 5. FIG. 4 is a diagram schematically illustrating a relationship between the individual coverage areas 10-1 to 10-3 of the base stations 3-1 to 3-3 and the coverage area 100 of the radio communication system 1. FIG. 5 is a diagram schematically illustrating processes of the communication control performed by the control station 5.

In step 100 (S100), the setting unit 54 sets a transmission power of each of the base stations 3-1 to 3-3 to be the maximum using the communication unit 50 and the network 4.

In step 102 (S102), the percentage calculation unit 52 calculates the percentages of the individual coverage areas 10-1 to 10-3 of the base stations 3 with respect to the coverage area 100 (percentages of the individual coverage areas), for example, based on the signal intensities, reception locations, MAC addresses, and the like collected by the collection unit 51.

For example, as initial value measurement, the percentage calculation unit 52 calculates the percentage of the individual coverage area 10-1 of the base station 3-1, the percentage of the individual coverage area 10-2 of the base station 3-2, and the percentage of the individual coverage area 10-3 of the base station 3-3 with respect to the coverage area 100 as illustrated in FIG. 4.

At this time, a power control value of the control station 5 for each of the base stations 3-1 to 3-3 is 0 dBm as illustrated in FIGS. 4 and 5. In addition, the percentage of the individual coverage area of the base station 3-1 is 50%, the percentage of the individual coverage area of the base station 3-2 is 30%, and the percentage of the individual coverage area of the base station 3-3 is 20%.

Further, each circle (○) mark illustrated in FIG. 4 schematically indicates a reception location (a measurement point of a signal intensity) uniformly set for the terminal station 2 to receive a signal transmitted by each of the base stations 3-1 to 3-3 within the individual coverage areas 10-1 to 10-3.

In step 104 (S104), the control unit 55 determines whether the maximum value of the percentages of the individual coverage areas deviates from the average value by a predetermined value or greater. In a case in which the control unit 55 determines that the maximum value of the percentages of the individual coverage areas deviates from the average value by a predetermined value or greater (S104: Yes), the control unit 55 proceeds to the processing of S106, and if it is determined that the maximum value does not deviate from the average value by the predetermined value or greater (S104: No), the control unit 55 ends the processing.

At this time, the control unit 55 determines whether the maximum value of the percentages of the individual coverage areas deviates from the average value by the predetermined value or greater, for example, using the variation (standard deviation) in percentages of the individual coverage areas. In the measurement of the initial value, the variation in percentages of the individual coverage areas is 12.5.

In step 106 (S106), the control unit 55 selects the base station 3 with the transmission power that deviates most from the average value.

In step 108 (S108), the control unit 55 determines whether the amount of deviation of the transmission power of the base station 3 selected in the processing of S106 from the average value is less than the predetermined value. The control unit 55 proceeds to the processing of S112 if the amount of deviation from the average value is less than the predetermined value (S108: Yes), or proceeds to processing of S110 if the amount of deviation from the average value is not less than the predetermined value (S108: No).

In step 110 (S110), the setting unit 54 makes a setting to lower the power control value of the base station 3 by a predetermined step according to control of the control unit 55 and then returns to the processing of S102. For example, the setting unit 54 performs power control such that the power control value is set to −3 dBm for the base station 3-1 with the maximum value of the percentages of the individual coverage areas deviating from the average value by the predetermined value or greater as in the first control illustrated in FIG. 5. Here, although the power control of setting the power control value to −3 dBm is assumed to be one step of power control, the magnitude of the power control value in one step is variable.

At this time, the percentage of the individual coverage area of the base station 3-1 is 40%, the percentage of the individual coverage area of the base station 3-2 is 40%, and the percentage of the individual coverage area of the base station 3-3 is 20% (see S102). In addition, the variation in percentages of the individual coverage areas is 9.4.

In step 112 (S112), the setting unit 54 makes a setting to increase the power control value of the base station 3 by a predetermined step according to control of the control unit 55 and then returns to the processing of S102.

In this manner, the control station 5 continues the processing until it is determined that the maximum value of the percentages of the individual coverage areas does not deviate from the average value by the predetermined value or greater.

For example, the setting unit 54 performs power control such that the power control value is set to −3 dBm for the base station 3-2 with the maximum value of the percentages of the individual coverage areas deviating from the average value by the predetermined value or greater as in the second control illustrated in FIG. 5.

At this time, the percentage of the individual coverage area of the base station 3-1 is 40%, the percentage of the individual coverage area of the base station 3-2 is 30%, and the percentage of the individual coverage area of the base station 3-3 is 30%. In addition, the variation in percentages of the individual coverage areas is 4.7.

Furthermore, in a case in which the control station 5 determines that the maximum value of the percentages of the individual coverage areas deviates from the average value by the predetermined value or greater, the setting unit 54 performs power control such that the power control value is set to −6 dBm for the base station 3-1 with the maximum value of the percentages of the individual coverage areas deviating from the average value by the predetermined value or greater as in the third control illustrated in FIG. 5.

At this time, the percentage of the individual coverage area of the base station 3-1 is 35%, the percentage of the individual coverage area of the base station 3-2 is 33%, and the percentage of the individual coverage area of the base station 3-3 is 30%. In addition, the variation in percentages of the individual coverage areas is 2.1.

For example, if the variation in percentages of the individual coverage areas is less than 3, the control station 5 determines that the maximum value of the percentages of the individual coverage areas does not deviate from the average value by the predetermined value or greater. In this case, the control station 5 ends the processing of the communication control after performing the third control illustrated in FIG. 5.

In this manner, the radio communication system 1 can make the individual coverage areas of the base stations 3-1 to 3-3 close to be equal, and can prevent connections of the terminal stations 2 from concentrating on some base stations 3 in the radio communication system 1.

In addition, because the radio communication system 1 performs the above-described processing using the area in which the base stations 3-1 to 3-3 are capable of performing radio communication as the coverage area 100, the radio communication system can control the transmission powers of the base stations 3-1 to 3-3 so as not to create a "dead zone" in which no signal can be received from any of the base stations 3-1 to 3-3 in the coverage area 100.

In addition, the radio communication system 1 may be configured to set a control range (upper limit and lower limit) of the transmission power of each base station 3 and to ensure the minimum power required for each of the base stations 3.

Further, some or all of the functions of the terminal stations 2, the base stations 3, and the control station 5 may be configured by hardware such as a programmable logic device (PLD) or a field programmable gate array (FPGA), or by a program executed by a processor such as a CPU.

The control station 5 according to the present disclosure can also be achieved by, for example, a computer and a program, and the program can be recorded in a storage medium or can be provided through a network.

Figure 6:
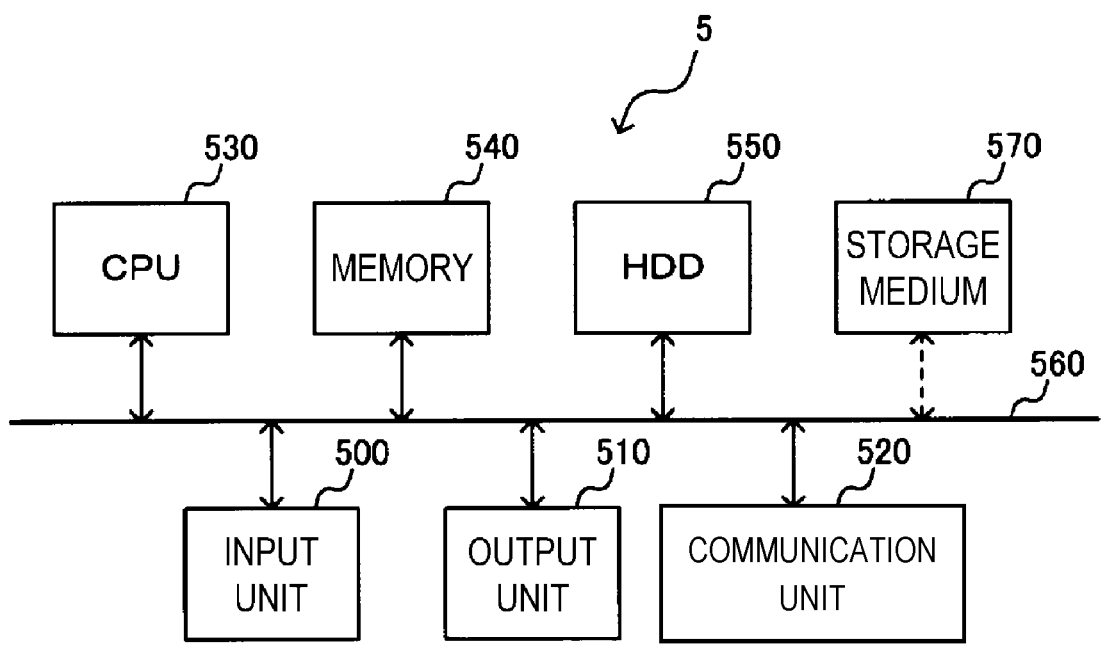
FIG. 6 is a diagram illustrating an exemplary hardware configuration of the control station according to the embodiment.

FIG. 6 is a diagram illustrating an exemplary hardware configuration of the control station 5 according to an embodiment. The control station 5 includes, for example, an input unit 500, an output unit 510, a communication unit 520, a CPU 530, a memory 540, and an HDD 550 connected via a bus 560 as illustrated in FIG. 6, and functions as a computer. In addition, the control station 5 is capable of exchanging data with a computer-readable storage medium 570.

Examples of the input unit 500 include a keyboard and a mouse. Examples of the output unit 510 include a display device such as a display. Examples of the communication unit 520 include a wired network interface.

The CPU 530 controls each of the units constituting the control station 5 and performs predetermined processing and the like. The memory 540 and the HDD 550 constitute a storage unit that stores data and the like. In particular, the memory 540 stores data to be used in the above-described processing. The storage medium 570 is capable of storing a communication control program that enables the functions of the control station 5 to be performed, and the like. Further, the architecture of the control station 5 is not limited to the example illustrated in FIG. 6.

In other words, the "computer" mentioned here is assumed to include an OS and hardware such as a peripheral device. In addition, the "computer-readable storage medium" refers to a storage device such as a portable medium such as a flexible disk, a magneto-optical disc, a ROM, and a CD-ROM.

Moreover, the "computer-readable storage medium" may include a recording medium that dynamically holds a program for a short period of time, such as a communication line in a case in which the program is transmitted via a network such as the Internet or a telephone line, or a recording medium that holds the program for a specific period of time, such as a volatile memory inside a computer that serves as a server or a client in that case.

Although the embodiments of the present disclosure have been described above with reference to the drawings, it is apparent that the embodiment described above is a mere example of the present disclosure, and the present disclosure is not limited to the embodiment described above. Thus, addition, omission, substitution, and other modifications of the constituent components may be made without departing from the technical spirit and scope of the present disclosure.

REFERENCE SIGNS LIST

1 Radio communication system
2 Terminal station
3-1 to 3-3 Base station
4 Network
5 Control station
10-1 to 10-3 Individual coverage area
50 Communication unit
51 Collection unit
52 Percentage calculation unit
53 Storage unit
54 Setting unit
55 Control unit
100 Coverage area
500 Input unit
510 Output unit
520 Communication unit
530 CPU
540 Memory
550 HDD
560 Bus
570 Storage medium

The invention claimed is:

1. A communication control method for controlling transmission powers transmitted by a plurality of base stations in a coverage area, the coverage area being covered by the plurality of base stations, the communication control method comprising:

setting a transmission power of each base station to a maximum;

calculating, for each base station, a percentage of an individual coverage area with respect to the coverage area when the transmission power of each base station is set to the maximum, the individual coverage area serving as a range in which each base station individually accommodates a terminal station; and performing control such that, when a maximum value of the calculated percentages deviates from an average value by a predetermined value or greater, the transmission power of any of the plurality of base stations with the maximum percentage value is reduced and a percentage of the individual coverage area with respect to the coverage area is newly calculated for each base station, wherein in the performing of the control, the control is continued until the maximum value of the calculated percentages deviates from the average value by less than the predetermined value.

2. The communication control method according to claim 1, wherein in the performing of the control, control is performed such that the transmission power of any of the plurality of base stations is reduced within a range in which all of the terminal stations located in the coverage area are capable of performing radio communication with at least one of the plurality of base stations.

3. A control station configured to control transmission powers transmitted by a plurality of base stations in a coverage area, the coverage area being covered by the plurality of base stations, the control station comprising:

a processor; and a storage medium having computer program instructions stored thereon, when executed by the processor, perform to:

set a transmission power of each base station to a maximum;

calculate, for each base station, a percentage of an individual coverage area with respect to the coverage area when the transmission power of each base station is set to the maximum, the individual coverage area serving as a range in which each base station individually accommodates a terminal station; and perform control such that, when a maximum value of the percentages deviates from an average value by a predetermined value or greater, the transmission power of any of the plurality of base stations with the maximum percentage value is reduced and the percentage calculation unit newly calculates, for each base station, a percentage of the individual coverage area with respect to the coverage area, wherein continues the control until the maximum value of the percentages deviates from the average value by less than the predetermined value.

4. The control station according to claim 3, wherein the computer program instructions further perform to control such that the transmission power of any of the plurality of base stations is reduced within a range in which all of the terminal stations located in the coverage area are capable of performing radio communication with at least one of the plurality of base stations.

5. A non-transitory computer-readable medium having computer-executable instructions that, upon execution of the instructions by a processor of a computer, cause the computer to function as the control station according to claim 3.

* * * * *